United States Patent
Choi et al.

(10) Patent No.: US 10,165,054 B2
(45) Date of Patent: Dec. 25, 2018

(54) CONTROL SYSTEM AND METHOD FOR IOT BOILERS USING CENTRAL MANAGEMENT SERVER

(71) Applicants: KITURAMI CO., LTD., Cheongdo-gun, Gyeongsangbuk-do (KR); Sung-Hwan Choi, Seoul (KR); Young-Hwan Choi, Seoul (KR)

(72) Inventors: Sung-Hwan Choi, Seoul (KR); Young-Hwan Choi, Seoul (KR)

(73) Assignees: KITURAMI CO., LTD., Cheongdo-gun (KR); Sung-Hwan Choi, Seoul (KR); Young-Hwan Choi, Seoul (KR)

(*) Notice: Subject to any disclaimer, the term of this patent is extended or adjusted under 35 U.S.C. 154(b) by 0 days.

(21) Appl. No.: 15/976,459

(22) Filed: May 10, 2018

(65) Prior Publication Data

US 2018/0262574 A1    Sep. 13, 2018

Related U.S. Application Data

(63) Continuation of application No. PCT/KR2017/008563, filed on Aug. 8, 2017.

(30) Foreign Application Priority Data

Mar. 13, 2017    (KR) ......................... 10-2017-0031350

(51) Int. Cl.
- *H04L 29/08* (2006.01)
- *G05B 19/406* (2006.01)
- *F24D 19/10* (2006.01)

(52) U.S. Cl.
CPC ........ *H04L 67/125* (2013.01); *F24D 19/1066* (2013.01); *G05B 19/406* (2013.01);
(Continued)

(58) Field of Classification Search
None
See application file for complete search history.

(56) References Cited

U.S. PATENT DOCUMENTS

| | | | | |
|---|---|---|---|---|
| 4,362,269 A | * | 12/1982 | Rastogi | ................... F23N 5/003 |
| | | | | 110/188 |
| 4,445,180 A | * | 4/1984 | Davis | ..................... F01D 17/24 |
| | | | | 290/40 R |

(Continued)

FOREIGN PATENT DOCUMENTS

| KR | 20-1999-0014493 U | 5/1999 |
|---|---|---|
| KR | 10-2005-0015037 A | 2/2005 |

(Continued)

OTHER PUBLICATIONS

An Office Action; "Notice of Allowance," issued by the Korean Intellectual Property Office dated Feb. 13, 2018, which corresponds to Korean Patent Application No. 10-2017-0031350.

(Continued)

*Primary Examiner* — Ramesh B Patel
(74) *Attorney, Agent, or Firm* — Studebaker & Brakett PC

(57) ABSTRACT

The present invention discloses control system and method of an IoT boiler. A control system of an IoT boiler according to the present invention includes: the IoT boiler that checks an operation state to transmit state information, and senses whether or not a fault occurs through a sensor to transmit fault information; a manager terminal that includes a boiler control application for monitoring and controlling the IoT boiler, monitors a state of the IoT boiler, receives control information for controlling the IoT boiler from a manager, and transmits the control information; and a central management server that is connected to the IoT boiler and the manager terminal through a network, periodically or non-periodically receives and stores the state information of the (Continued)

IoT boiler from the IoT boiler, and receives the control information for controlling the IoT boiler from the manager terminal to perform control of the IoT boiler.

12 Claims, 12 Drawing Sheets

(52) U.S. Cl.
CPC .............. *G05B 2219/31346* (2013.01); *G05B 2219/31455* (2013.01)

(56) References Cited

U.S. PATENT DOCUMENTS

| | | | | |
|---|---|---|---|---|
| 5,042,431 A | * | 8/1991 | Shprecher | ............. F22B 35/008 |
| | | | | 122/448.3 |
| 2002/0133270 A1 | * | 9/2002 | Hung | ...................... F22B 35/18 |
| | | | | 700/286 |
| 2015/0195365 A1 | * | 7/2015 | Choi | ....................... H04L 67/16 |
| | | | | 715/739 |
| 2015/0347114 A1 | * | 12/2015 | Yoon | .......................... G06F 8/61 |
| | | | | 235/375 |
| 2016/0330285 A1 | * | 11/2016 | Brophy | .................... F24F 11/30 |
| 2016/0344815 A1 | * | 11/2016 | Hyun | .................... H04L 67/125 |
| 2017/0013062 A1 | * | 1/2017 | Kim | ....................... H04L 67/125 |
| 2017/0034281 A1 | * | 2/2017 | Jung | ..................... H04L 67/125 |
| 2017/0118640 A1 | * | 4/2017 | Lee | ................. G06Q 20/40145 |
| 2017/0192409 A1 | * | 7/2017 | Kim | ....................... G05B 19/042 |
| 2017/0220236 A1 | * | 8/2017 | Kwon | ................. G06F 3/04817 |
| 2017/0242412 A1 | * | 8/2017 | Kim | ....................... G05B 15/02 |

FOREIGN PATENT DOCUMENTS

| | | |
|---|---|---|
| KR | 10-2005-0106650 A | 11/2005 |
| KR | 20-2009-0002460 U | 3/2009 |
| KR | 10-2015-0044639 A | 4/2015 |

OTHER PUBLICATIONS

An Office Action; "Notification of Reason for Refusal," issued by the Korean Intellectual Property Office dated Oct. 30, 2017, which corresponds to Korean Patent Application No. 10-2017-0031350.

* cited by examiner

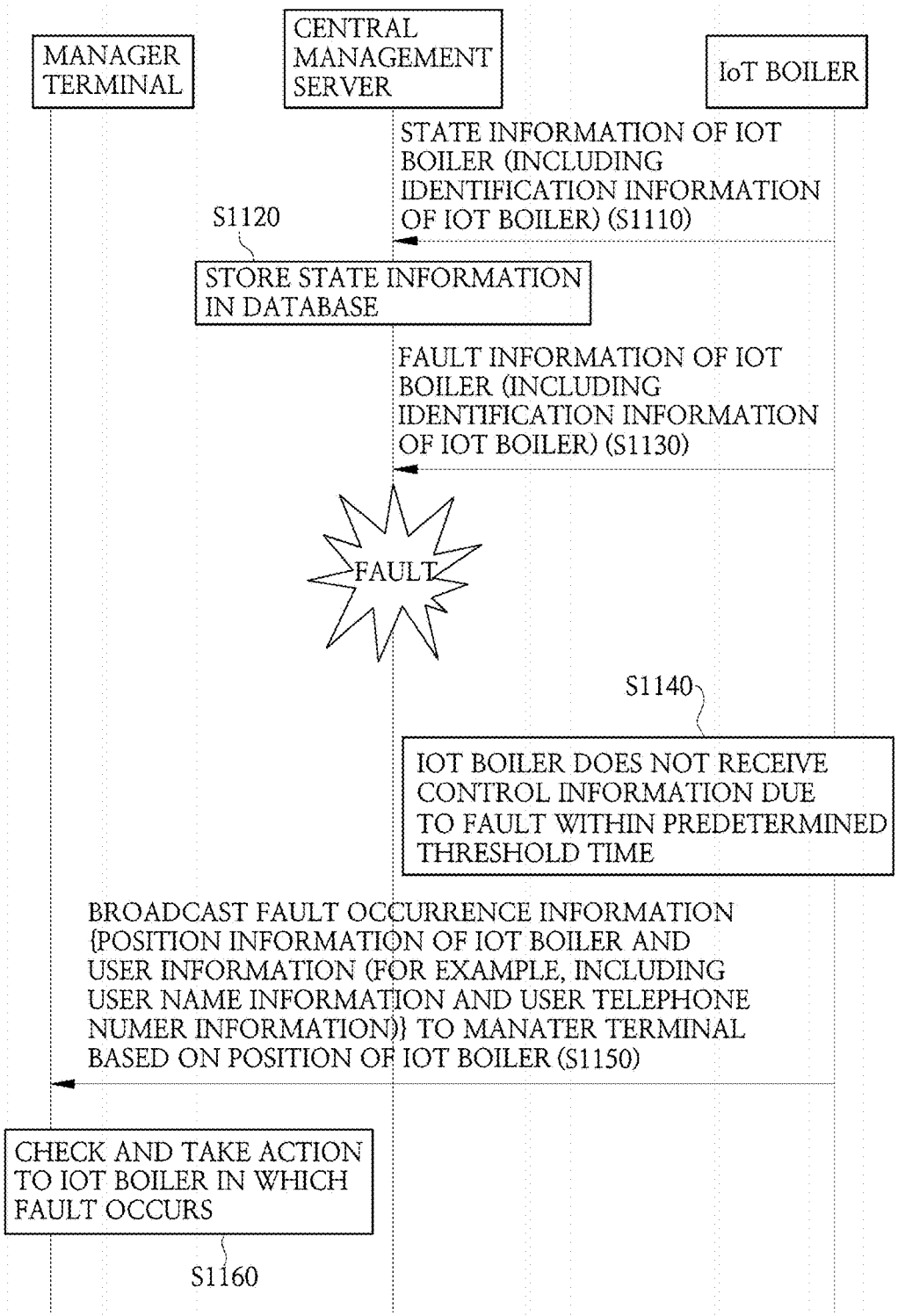

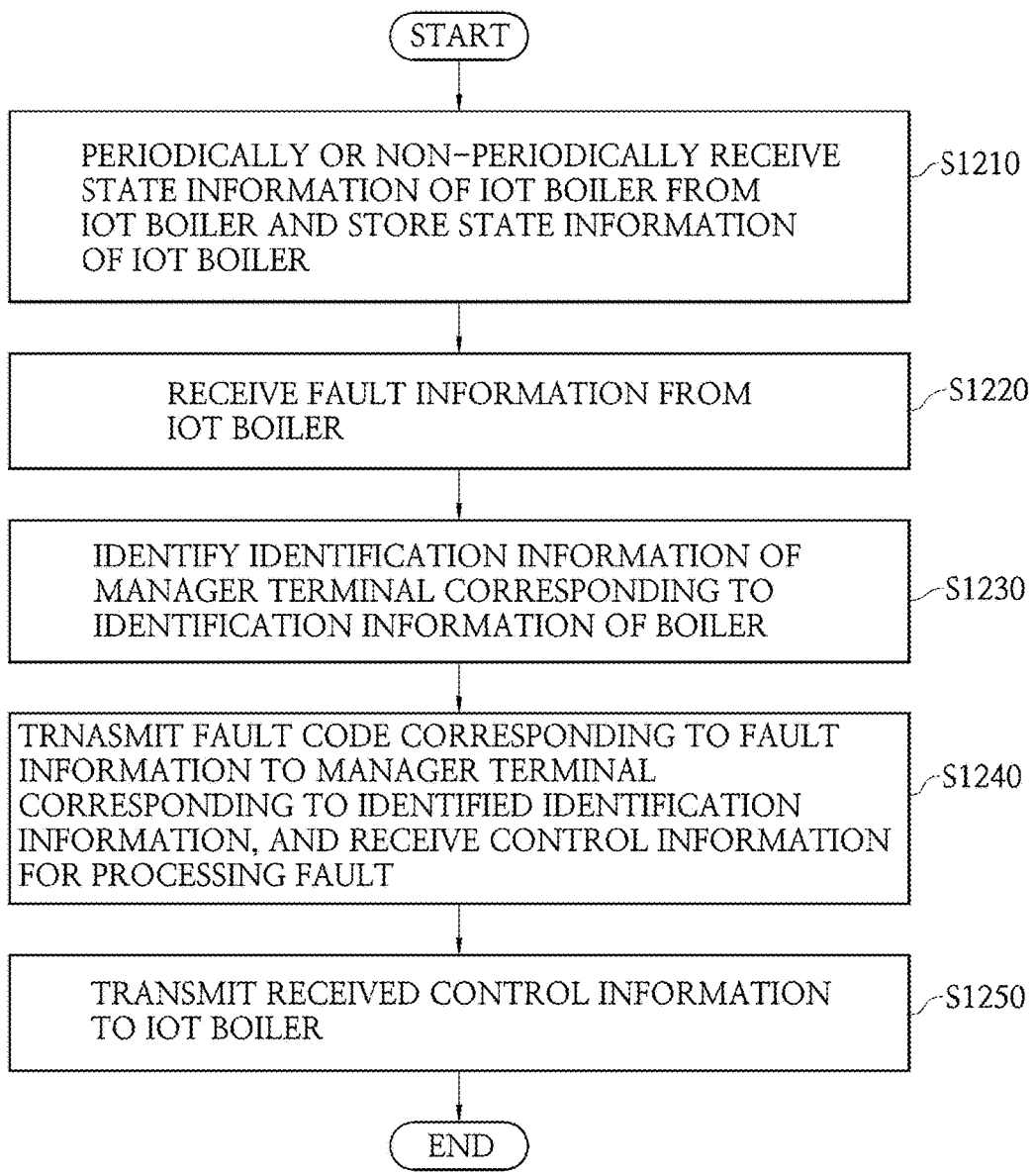

CONTROL SYSTEM AND METHOD FOR IOT BOILERS USING CENTRAL MANAGEMENT SERVER

CROSS-REFERENCE TO RELATED APPLICATIONS

The present application is a continuation of International Patent Application No. PCT/KR2017/008563, filed on Aug. 8, 2017, which is based upon and claims the benefit of priority to Korean Patent Application No. 10-2017-0031350, filed on Mar. 13, 2017. The disclosures of the above-listed applications are hereby incorporated by reference herein in their entirety.

TECHNICAL FIELD

The present invention relates to control system and method of an Internet of Things (IoT) boiler and, more particularly, to control system and method of an IoT boiler capable of easily monitoring and controlling state information of a plurality of IoT boilers distributed over a wide area.

BACKGROUND ART

In general, in a method of managing and maintaining a boiler applied in a large-scale housing complex, an apartment, a factory, a shopping mall, a hotel, or the like, a customer observers and records an operating state, abnormality or normality, or the like of the boiler by disposing a certain number of personnel. However, cost due to the disposition of a certain number of personnel and a shutdown of the boiler due to carelessness of the management may cause fatal loss. In addition, at the time of the boiler shutdown, in order to solve the problem with the minimum time, in the current management system, the user manually calls an SERVICE management company or a manufacturer and an SERVICE manager visits the site of the boiler, and thus it may take long time to solve the problem due to the shutdown of the boiler. In addition, all of the customer, the service management company, and the manufacturer are not able to process in real time history data for fuel consumption, an alarm, abnormal operation, and the like of the boiler, and high-capacity information of daily, monthly, and yearly operation time, accumulation data for each sensor, and the like, which are required to manage the boiler.

In order to solve such problems, an automatic control controller and a visual display are installed in a corresponding boiler. However, there is still an inconvenience that the boiler is required to be controlled according to the operating state through the service manager at the time of a breakdown of the boiler. In addition, recently, a system for managing a boiler in a certain area by using an application program on a PC has been introduced. However, this is also troublesome and inconvenient because it is necessary to dispose management personnel for each area and to receive follow-up management instructions through only a telephone call at the time of a breakdown occurrence.

Therefore, a real-time control system for a boiler that is widely dispersed is needed for efficiency of the operation and the management of the boiler and efficient control according to the abnormal operation of the boiler to all of the customer, the service management, and the manufacturer.

(Patent Document 1) Korean Patent Application Publication No. 2005-0106650 (Published Nov. 11, 2005)

DISCLOSURE

Technical Problem

Accordingly, the present invention has been made keeping in mind the above problems occurring in the prior art, and an object of the present invention is to provide control system and method of an IoT boiler capable of monitoring state information of the IoT boiler in real time and capable of quickly controlling the IoT boiler when a fault occurs.

Other objects and advantages of the present invention can be understood by the following description, and will be more clearly understood by an embodiment of the present invention. In addition, it will be easily understood that the objects and advantages of the present invention can be realized by means shown in the claims and a combination thereof.

Technical Solution

In order to accomplish the above object, the present invention provides a control system of an IoT boiler. A control system of an IoT boiler according to an aspect of the present invention includes: the IoT boiler that checks an operation state to transmit state information, and senses whether or not a fault occurs through a sensor to transmit fault information; a manager terminal that includes a boiler control application for monitoring and controlling the IoT boiler, monitors a state of the IoT boiler, receives control information for controlling the IoT boiler from a manager, and transmits the control information; and a central management server that is connected to the IoT boiler and the manager terminal through a network, periodically or non-periodically receives and stores the state information of the IoT boiler from the IoT boiler, and receives the control information for controlling the IoT boiler from the manager terminal to perform control of the IoT boiler.

In a case where the central management server receives the fault information of a boiler from the IoT boiler, the central management server may transmit a fault code corresponding to the fault information to the manager terminal, and receive the control information for controlling the IoT boiler from the manager terminal to perform a fault process of the IoT boiler.

The state information of the boiler may further include identification information of the IoT boiler, and when the central management server receives the fault information including the identification information of the boiler from the IoT boiler, the central management server may identify identification information of the manager terminal corresponding to the identification information of the IoT boiler stored in a database in advance, and transmit the fault code corresponding to the fault information of the IoT boiler to the manager terminal.

The IoT boiler may sense the fault occurrence through the sensor and transmit the fault information to the central management server, and in a case where the IoT boiler does not receive a response message corresponding to the fault information within a predetermined threshold time, the IoT boiler may broadcast fault occurrence information to the manager terminal based on position information of the IoT boiler.

The fault occurrence information may include the position information of the IoT boiler, and user information including user name and telephone number information using an installed boiler.

After the IoT boiler broadcasts the fault occurrence information to the manager terminal, the IoT boiler may turn off power.

In a case where the manager logs in, the manager terminal may display a position of an installed IoT boiler on an electronic map based on the electronic map that is stored in advance, display information of the installed IoT boiler differently according to an authority, and provide a function of monitoring and controlling the IoT boiler.

The IoT boiler may be displayed as a single unit or a group, and the function of monitoring and controlling the IoT boiler may monitor and control power on/off of the IoT boiler, operating on/off of the IoT boiler, heating hot water, and controlling return water temperature of the IoT boiler.

In order to accomplish the above object, the present invention provides a control method of an IoT boiler. A control method of an IoT boiler according to another aspect of the present invention, in a control system of the IoT boiler including the IoT boiler, checks an operation state to transmit state information and senses whether or not a fault occurs through a sensor to transmit fault information, a manager terminal that includes a boiler control application for monitoring and controlling the IoT boiler monitors a state of the IoT boiler, receives control information for controlling the IoT boiler from a manager, and transmits the control information, and a central management server that is connected to the IoT boiler and the manager terminal through a network, includes: periodically or non-periodically receiving and storing the state information of the IoT boiler from the IoT boiler, by the central management server; receiving the fault information from the IoT boiler, by the central management server, identifying identification information of the manager terminal corresponding to identification information of the boiler, by the central management server; transmitting a fault code corresponding to the fault information to the manager terminal corresponding to the identified identification information, and receiving the control information for processing a fault, by the central management server; and transmitting received control information to the IoT boiler, by the central management server.

The state information of the boiler may further include the identification information of the IoT boiler, and in receiving the fault information from the IoT boiler, the central management server may identify the identification information of the manager terminal corresponding to the identification information of the IoT boiler stored in a database in advance, and transmit the fault code corresponding to the fault information of the IoT boiler to the manager terminal.

The IoT boiler may sense the fault occurrence through the sensor and transmit the fault information to the central management server, and in a case where the IoT boiler does not receive a response message corresponding to the fault information within a predetermined threshold time, the IoT boiler may broadcast fault occurrence information to the manager terminal based on position information of the IoT boiler.

The fault occurrence information may include the position information of the IoT boiler, and information including name and telephone number of a user using an installed boiler.

After the IoT boiler broadcasts the fault occurrence information to the manager terminal, the IoT boiler may turn off power.

In a case where the manager logs in, the manager terminal may display a position of an installed IoT boiler on an electronic map based on the electronic map that is stored in advance, display information of the installed IoT boiler differently according to an authority, and provide a function of monitoring and controlling the IoT boiler.

The IoT boiler may be displayed as a single or a group, and the function of monitoring and controlling the IoT boiler may monitor and control power on/off of the IoT boiler, operating on/off of the IoT boiler, heating hot water, and controlling return water temperature of the IoT boiler.

Advantageous Effects

According to an aspect of the present invention, the state information of the IoT boiler installed in a wide area can be monitored in real time, and in a case where a fault occurs in the IoT boiler, a problem due to the fault occurrence can be quickly controlled remotely.

The effects obtained in the present invention are not limited to the above-mentioned effects, and other effects that are not mentioned may be clearly understood by those skilled in the art from the following description.

DESCRIPTION OF DRAWINGS

The following drawings attached with the present specification illustrate preferred embodiments of the present invention, and are intended to further illustrate the technical idea of the present invention together with specific contents for realizing the invention, and thus the present invention should not be construed as being limited to the matters disclosed in such drawings.

FIG. 11 is a schematic flowchart for a control method of an IoT boiler according to another embodiment of the present invention.

FIG. 12 is a schematic flowchart for a control method of the IoT boiler in a central management server according to an embodiment of the present invention.

MODE FOR INVENTION

The above-described objects, features, and advantages will be more apparent through the following detailed description related to the accompanying drawings. Therefore, those skilled in the art may easily implement technical spirit of the present invention. In addition, in describing the present invention, in a case where it is determined that specific descriptions of well-known technique related to the present invention may unnecessarily obscure the gist of the present invention, detailed descriptions thereof will be omitted. Hereinafter, a preferred embodiment according to the present invention will be described with reference to the accompanying drawings.

Throughout the specification, when a portion "includes" an element, which means that the portion may further include another element not excluding another element unless specially disclosed otherwise. In addition, the term "~unit" or the like means a unit that processes at least one function or operation, and may be implemented in hardware, software, or a combination of hardware and software.

Figure 1:
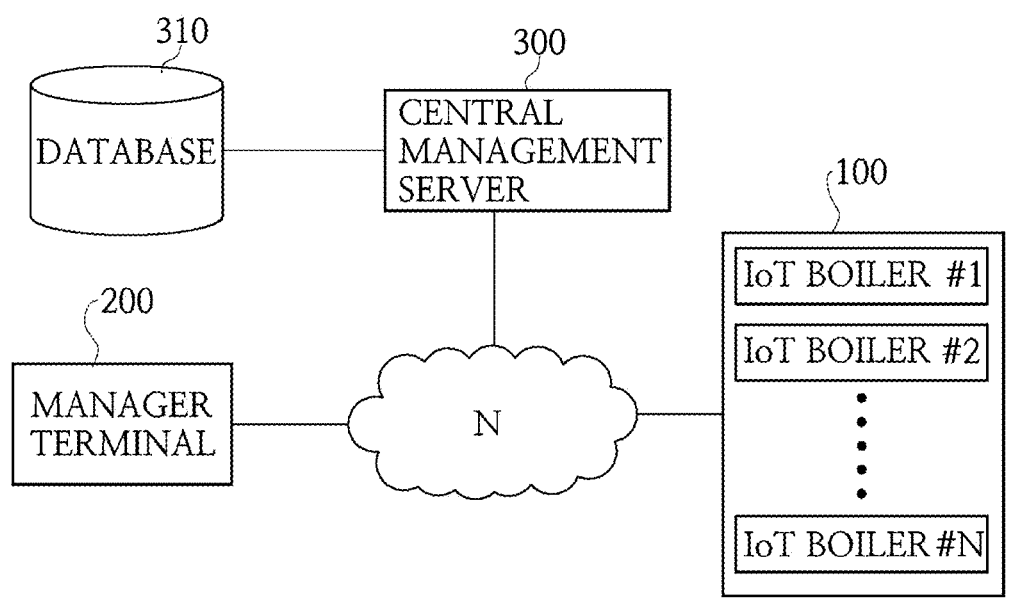
FIG. 1 is a schematic configuration diagram of a control system of an IoT boiler according to an embodiment of the present invention.

FIG. 1 is a schematic configuration diagram of a control system of an IoT boiler according to an embodiment of the present invention.

Referring to FIG. 1, the control system of the IoT boiler according to an embodiment of the present invention includes an Internet of Things (IoT) boiler 100, a manager terminal 200, and a central management server 300.

The IoT boiler 100 is installed in a home, a factory, a company, or the like to heat a room or warm supplied water to supply hot water. The IoT boiler 100 may include a sensor that senses whether or not a fault occurs. At this time, the sensor may be a sensor capable of sensing the fault occurrence of various IoT boilers 100. The occurred fault may be lack of cooling water, gas leakage, or the like of the IoT boiler 100.

The IoT boiler 100 may check an operation state to transmit state information. At this time, the state information may include various pieces of information related to an operation of the IoT boiler 100. The IoT boiler 100 may sense whether or not the fault occurs through the sensor and may transmit the presence or absence of the fault occurrence to the central management server 300 which will be described later. In addition, the IoT boiler 100 may include a coordinate sensor that calculates position information thereof. In a case where the IoT boiler 100 is not able to receive a response message (for example, control information including process information according to the fault) corresponding the fault information within a predetermined threshold time (in a case where a fault occurs in the central management server 300 and thus the IoT boiler 100 is not able to receive the response message) after the IoT boiler 100 senses the fault occurrence and transmits the fault information to the central management server 300, the IoT boiler 100 may broadcast fault occurrence information to the manager terminal 200. At this time, the IoT boiler 100 may broadcast the fault occurrence information to an authorized manager terminal 200 regardless of an area based on the position information of the IoT boiler. In addition, the IoT boiler 100 also may broadcast the fault occurrence information to a plurality of manager terminals 200 within a distance in which communication may be performed based on the position information thereof. The fault occurrence information may include the position information of the IoT boiler 100 and name and/or telephone number information of the user using an installed boiler. Therefore, a manager of the manager terminal 200 receiving the fault occurrence information may call the user of the IoT boiler 100 in which the fault occurs by a corded telephone using the telephone number information to take a priority action, and then may directly visit to the user to resolve the fault. After the IoT boiler 100 broadcasts the fault occurrence information to the manager terminal 200, the IoT boiler 100 turns off power of the IoT boiler 100 to prevent an accident in advance, such as a fire due to overheat of the IoT boiler 100 which may occur owing to a false operation. Meanwhile, in describing the present embodiment, although the IoT boiler 100 is described as a single unit, the present invention is not limited thereto, and as shown in FIG. 1, the IoT boiler 100 may refer to a plurality of IoT boilers 100. The IoT boiler 100 may be displayed as a single unit or a group. In a case where a plurality of IoT boilers 100 is installed in a facility such as a company and/or a factory, the IoT boilers 100 may be grouped together based on the position and then may be displayed.

The manager terminal 200 may include a boiler control application for monitoring and controlling the IoT boiler 100. At this time, the boiler control application may be downloaded by accessing the central management server 300 which will be described later. The manager terminal 200 may generate a management account by providing information of the manager to the central management server 300 which will be described later through the boiler control application and access the central management server 300 using the generated account. At this time, when generating the management account, the manager terminal 200 may receive an authority from the central management server 300 which will be described later and may differently display information of the IoT boiler according to the received authority. Meanwhile, the authority may be a monitoring authority to which only a monitoring authority is given and/or a monitoring/control authority having a control authority from a remote place at the time of the fault occurrence as well as the monitoring authority. In a case where the manager logs in, the manger terminal 200 may display the position of the IoT boiler 100 installed based on an electronic map that is stored in advance on the electronic map, and may provide various functions of monitoring and controlling the IoT boilers 100. The manager terminal 200 displays the position of the IoT boiler 100 on the electronic map, and may display the information of the installed IoT boiler 100 differently according to the authority. At this time, the function of monitoring and controlling the IoT boiler 100 may be a function of monitoring and controlling power on/off of the IoT boiler 100, operating on/off of the IoT boiler 100, heating hot water, and controlling return water temperature of the IoT boiler 100. The manager terminal 200 may monitor the state of the IoT boiler 100 through the boiler control application. The manager terminal 200 may receive the control information for controlling the IoT boiler 100 from the manager and may transmit the control information to the central management server 300 which will be described later. Meanwhile, as long as the manager terminal 200 is a device (for example, a smart phone, a smart pad, a PC, or the like) capable of communicating with the central management server 300 which will be described later and capable of displaying information of the IoT boiler 100 which will be described later through a browser, the manager terminal 200 may be any device. Meanwhile, an example of various interfaces in the manager terminal 200 that controls the IoT terminal 200 will be described with reference to FIGS. 2 to 9.

The central management server 300 may be connected to the IoT boiler 100 and the manager terminal 200 through a network W. At this time, the network may refer to a network capable of transmitting and receiving data by an Internet protocol using various wired or wireless communication technologies such as an Internet network, an intranet network, a mobile communication network, and a satellite communication network. Meanwhile, the network may be commonly called as a network such as a Code Division Multiple Access (CDMA), a Wideband Code Division Multiple Access (WCDMA), a Global System for Mobile Communication (GSM), a Long Term Evolution (LTE), and an Evolved Packet Core (EPC), the next generation network which will be implemented in the future, and a computing network, as well as a closed type network such as a Local Area Network (LAN) and a Wide Area Network (WAN), an open type network such as the Internet.

The central management server 300 may provide information related to the IoT boiler 100 to the manager terminal 200. That is, the central management server 300 may provide system information of the IoT boiler 100 and the state information of the IoT boiler 100 to the manager terminal 200. At this time, the system information of the IoT boiler 100 may be operation information related to a operating of the boiler, control information for controlling the boiler, and the like.

The central management server 300 may periodically or non-periodically receive the state information of the IoT boiler 100 from the IoT boiler 100, and store the state information of the IoT boiler 100 in a database 310. At this time, the state information of the IoT boiler 100 may refer to various pieces of information related to the operation of the IoT boiler 100. Meanwhile, the state information of the IoT boiler 100 may further include identification information (for example, sole identification ID for identifying the boiler) of the IoT boiler 100 and the position information of the IoT boiler 100. At this time, the position information of the IoT boiler 100 may be GPS coordinate information. The central management server 300 may receive the control information for controlling the IoT boiler 100 from the manager terminal 200, and may perform the control of the IoT boiler 100.

The central management server 300 may receive the fault information from the IoT boiler 100. In a case where the central management server 300 receives the fault information from the IoT boiler 100, the central management server 300 may transmit a fault code corresponding to the fault information to the manager terminal 200. More specifically, in a case where the central management server 300 receives the fault information including the identification information from the IoT boiler 100, the central management server may identify the identification information of the manager terminal 200 corresponding to the identification information of the IoT boiler 100 stored in the database 310 in advance, and may transmit the fault code corresponding to the fault information of the IoT boiler 100 to the manager terminal 200. At this time, the fault codes matched with the various pieces of fault information may be stored in the database 310 in advance. The central management server 300 may receive the control information for controlling the IoT boiler 100 from the manager terminal 200, transmit the control information to the IoT boiler 100, and perform a fault process of the boiler in which the fault occurs. Meanwhile, in the database 310 interlocked with the central management server 300, the state information of the IoT boiler 100 and the fault information of the IoT boiler 100 may be included. At this time, the state information of the IoT boiler 100 may be matched with the identification information of the IoT boiler 100 and may be stored. In addition, in order to distinguish the manager who is in charge of managing the IoT boiler 100, the identification information of the IoT boiler 100 may be matched with the identification information of the manager terminal 200 and may be stored. In addition, in the database 310, identification information (for example, an identification number such as an ID) and position information registered by the manager at the time of the installation may be mapped with each other and may be stored.

FIGS. 2 to 9 are diagrams illustrating an example of an interface of the manager terminal that controls the IoT boiler according to an embodiment of the present invention.

In describing FIGS. 2 to 9, the shown interface may be an interface shown in a case where the boiler control application of the manager terminal 200 is executed. Meanwhile, it is preferable that an operation process of the boiler control application is operated on a background, but the present invention is not limited thereto, and the operation process of the boiler control application may be operated in a case where information related to the fault is received from the central management server 300 or the IoT boiler 100. In addition, in describing the present embodiment, an element displayed on a screen of the manager terminal 200 is the IoT boiler 100, but the present invention is not limited thereto, and in a case where the IoT boiler 100 is a group type, the element displayed on the screen may be referred to as a central control system that controls the grouped IoT boilers 100 in the center. Meanwhile, boiler control application may provide functions related to a list of an installed boiler, a boiler management history, and a boiler (product) registration.

Figure 2:
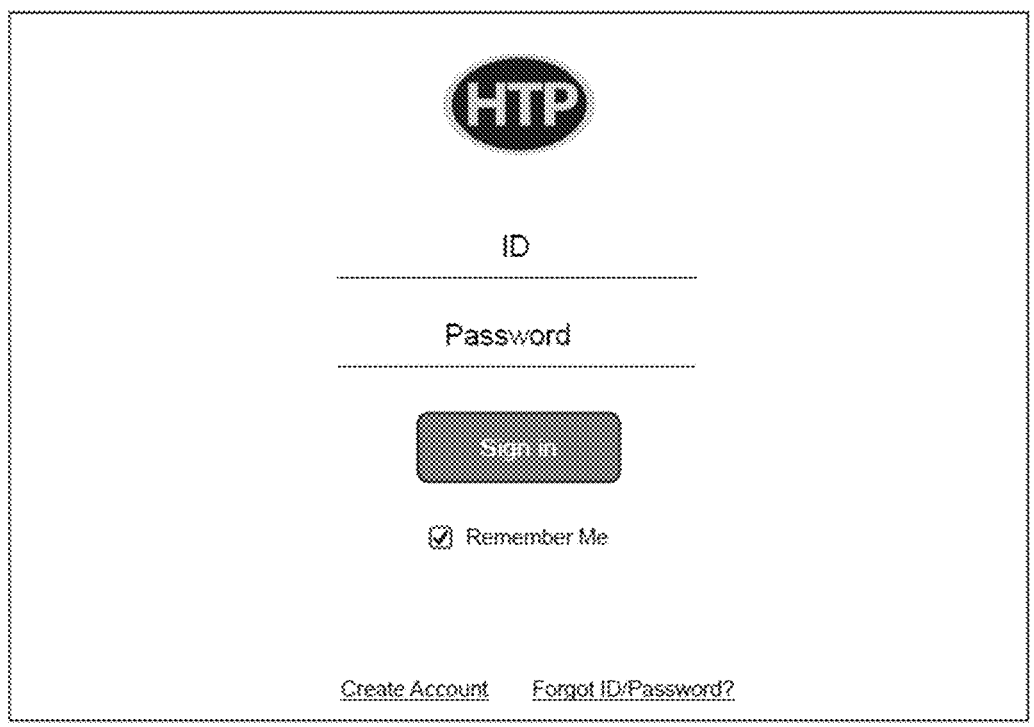
FIGS. 2 to 9 are diagrams illustrating an example of an interface of a manager terminal that controls the IoT boiler according to an embodiment of the present invention.

As shown in FIG. 2, the manager may log in through a login screen of the boiler control application of the manager terminal 200. At this time, an interface for a login, a membership registration, ID and password search may be displayed on the displayed screen. Meanwhile, information related to the login, membership registration, ID and password search may be stored in the database 310 and may be managed.

In a case where the manager logs in through the manager terminal 200, an interface as shown in FIGS. 3 to 9 may be provided.

Figure 3:
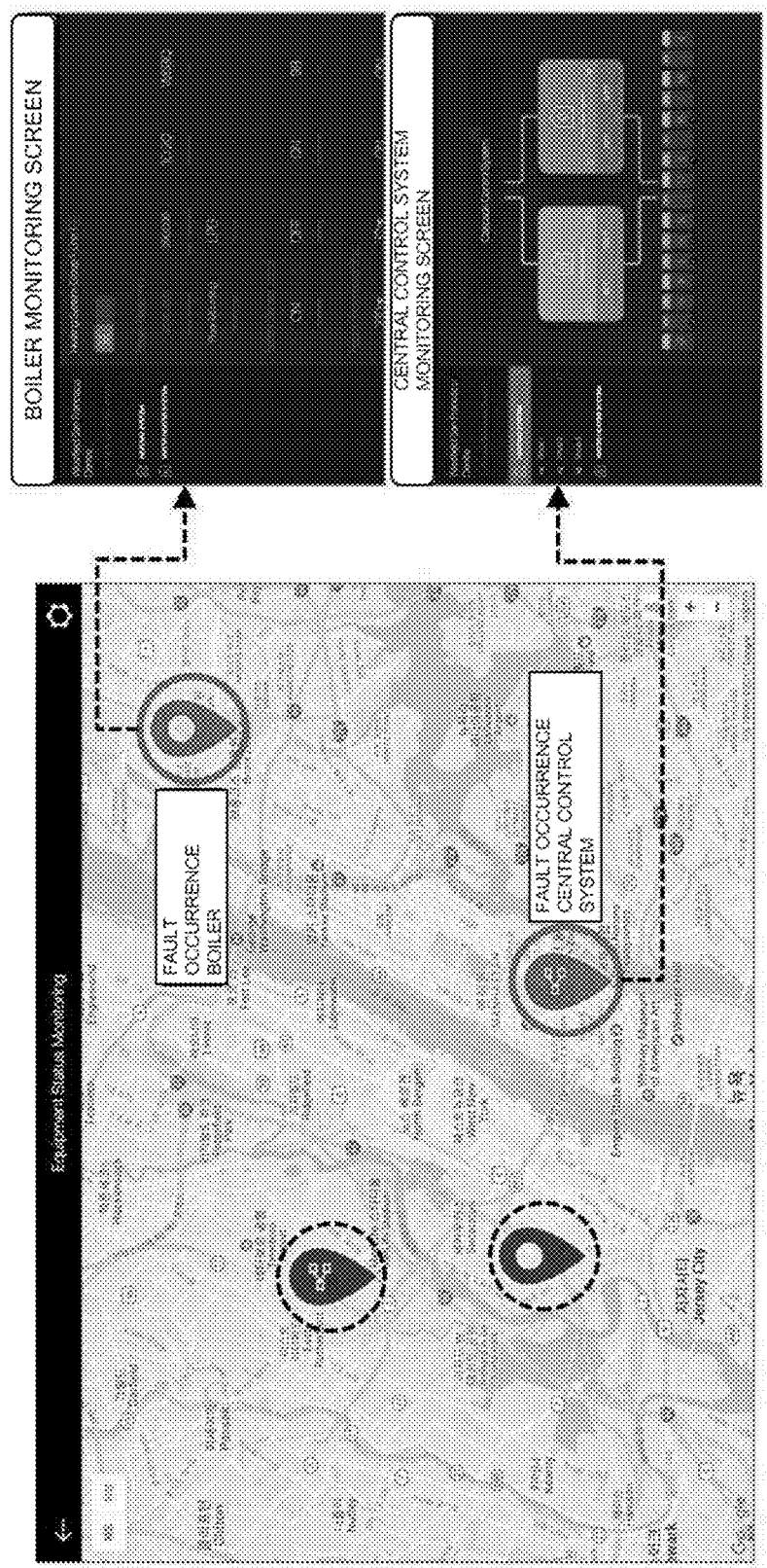

FIG. 3 is an interface providing a screen of an area where the IoT boiler 100 is installed. The manager may select a preferred area of management when the manager registers membership. The IoT boiler 100 registered on the electronic map may be mainly displayed in the preferred area, and the position of the installed IoT boiler 100 may be displayed in units of states, cities, and dongs. Meanwhile, the IoT boiler 100 displayed on the electronic map may be displayed as a single unit or a group, and in a case where the IoT boiler 100 is the group, the IoT boiler 100 may be displayed as a central control system that manages the group. At this time, in a case where a fault occurs in the IoT boiler 100, a separate color (for example, a red) may be displayed on the interface screen so that the manager can easily identify the fault. In a case where a displayed corresponding icon is selected, a monitoring screen may be displayed.

Figure 4:
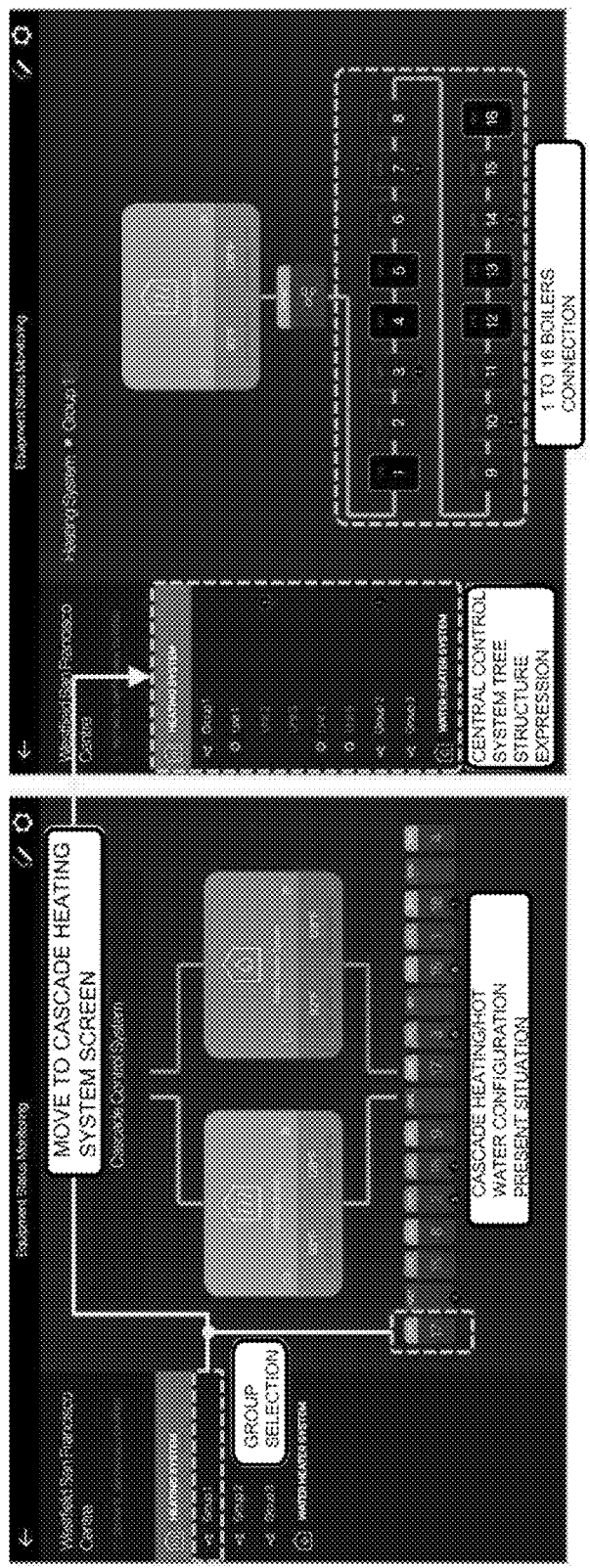
Figure 5:
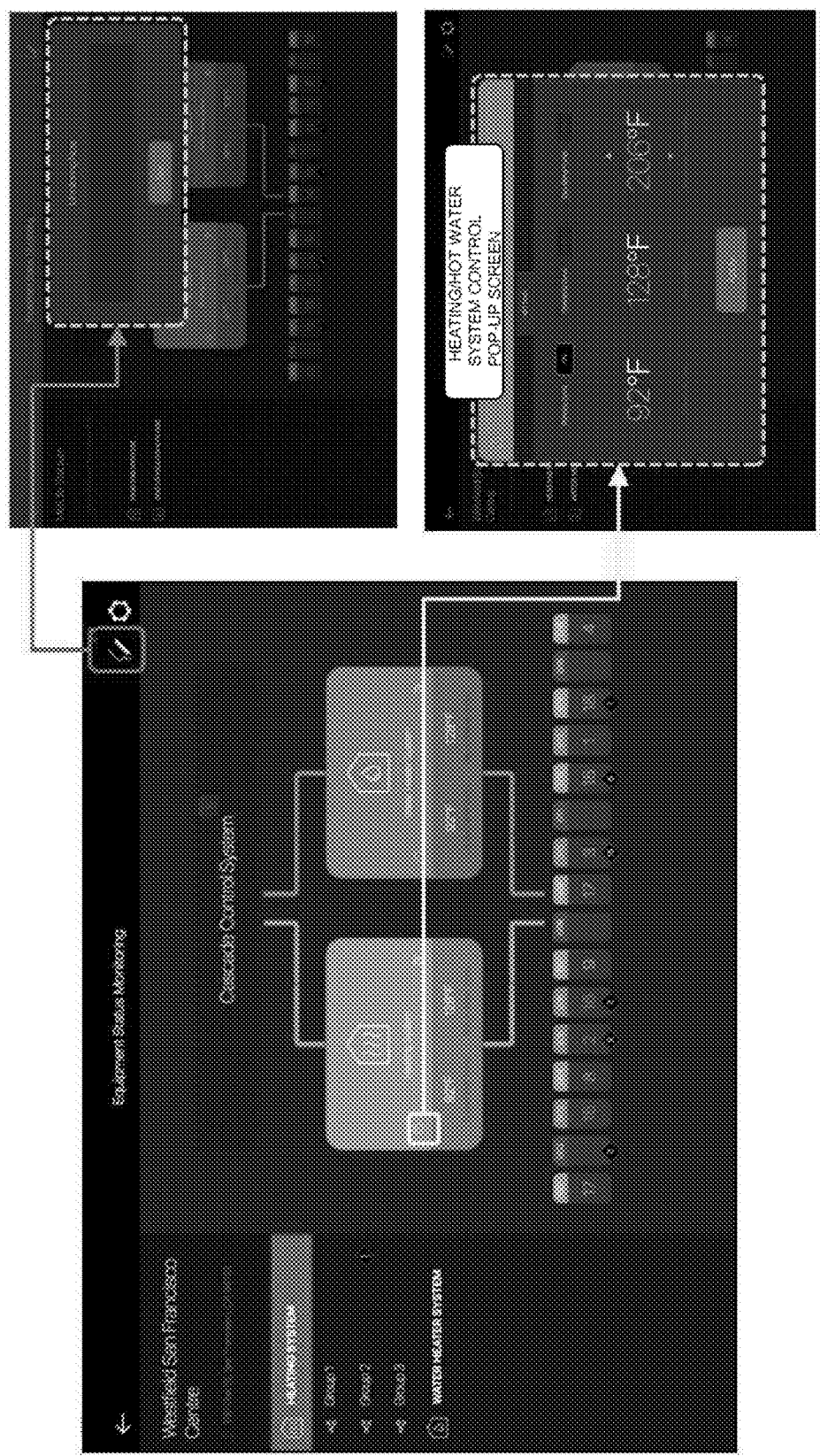
Figure 6:
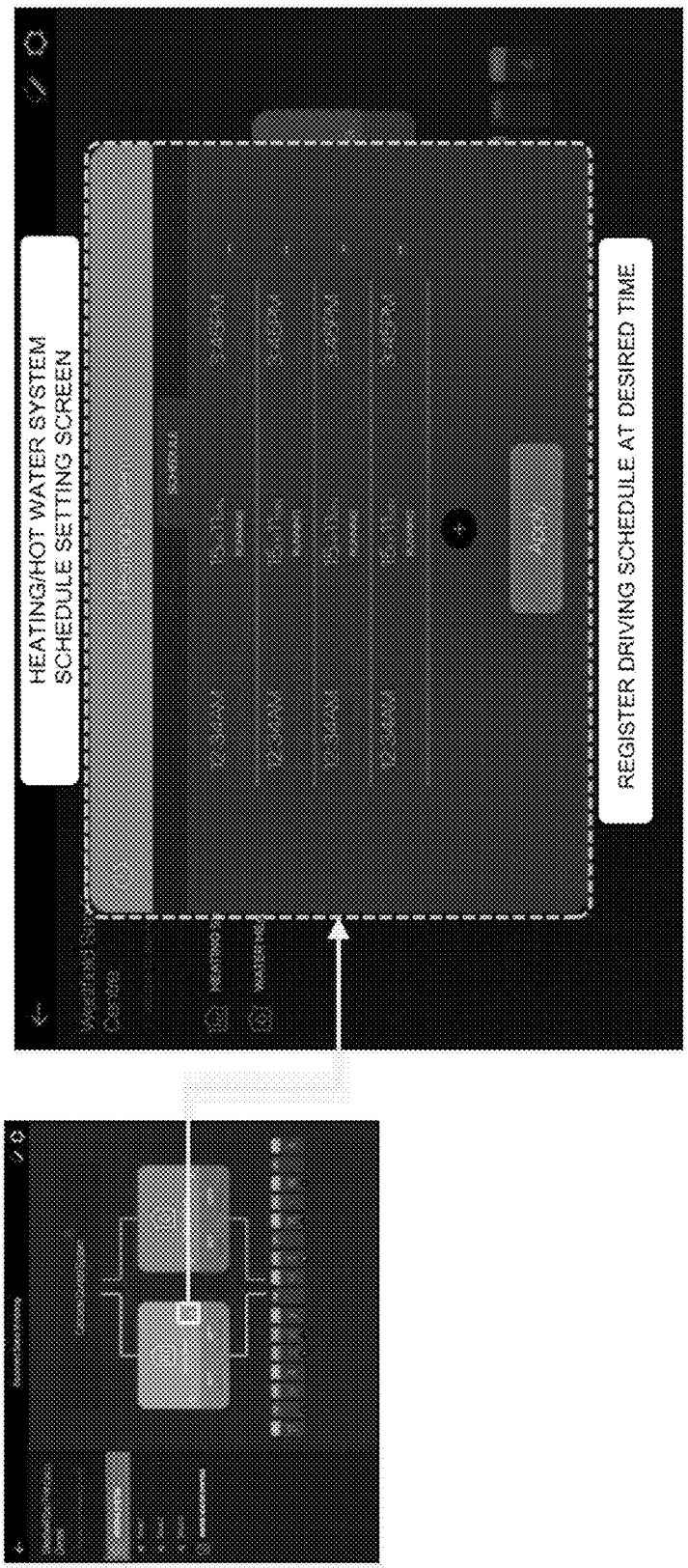

FIGS. 4 to 6 are an interface providing the monitoring screen of the central control system.

In a case where a plurality of IoT boilers 100 are installed in one building such as a company or a factory, the plurality of IoT boilers 100 may be grouped and may be managed under a management of the central control system. At this time, the central control system may manage up to 16 IoT boilers 100, and the central control system may transmit information (for example, state value and the like) of the IoT boiler 100 managed through a main controller to the central management server 300. Meanwhile, as shown in FIG. 5, power and operating control of the entire central control system may be controlled, and return water temperature may be set. In addition, as shown in FIG. 6, heating and hot water states may be controlled, and at this time, the heating and hot water states may be controlled according to a registered control schedule in a range from one week to one month. In addition, the central control system may also set whether turn on or turn off the boiler in units of 20 minutes.

Figure 7:
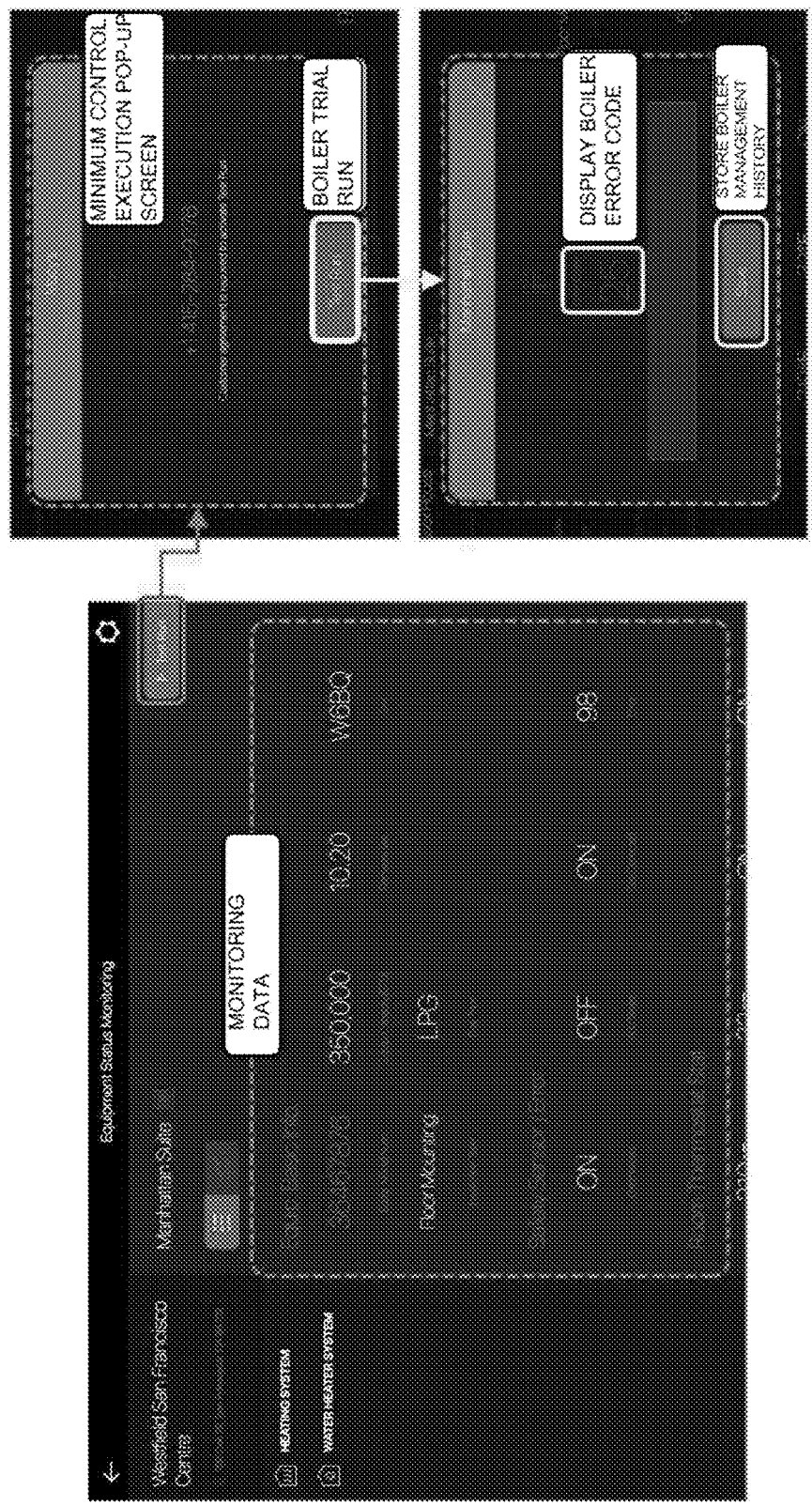

FIG. 7 is an interface screen for monitoring the state of the IoT boiler 100. In a case where the fault occurs in the IoT boiler 100, the interface screen may provide relation information by executing a minimum control so that the manager may take action to the fault. At this time, the minimum control execution may be executed only in the IoT boiler 100 receiving a prior consent of a customer.

Figure 8:
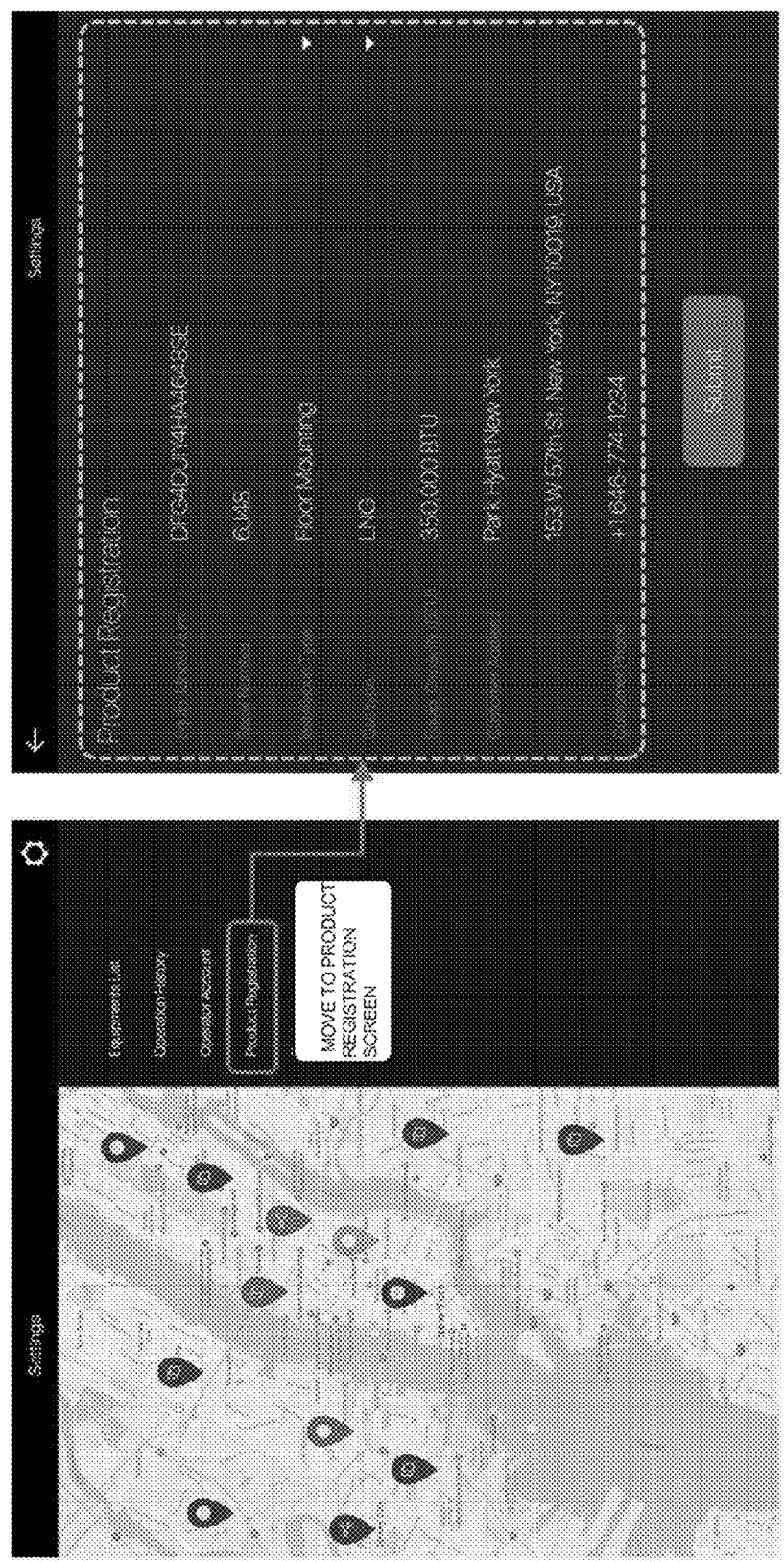
Figure 9:
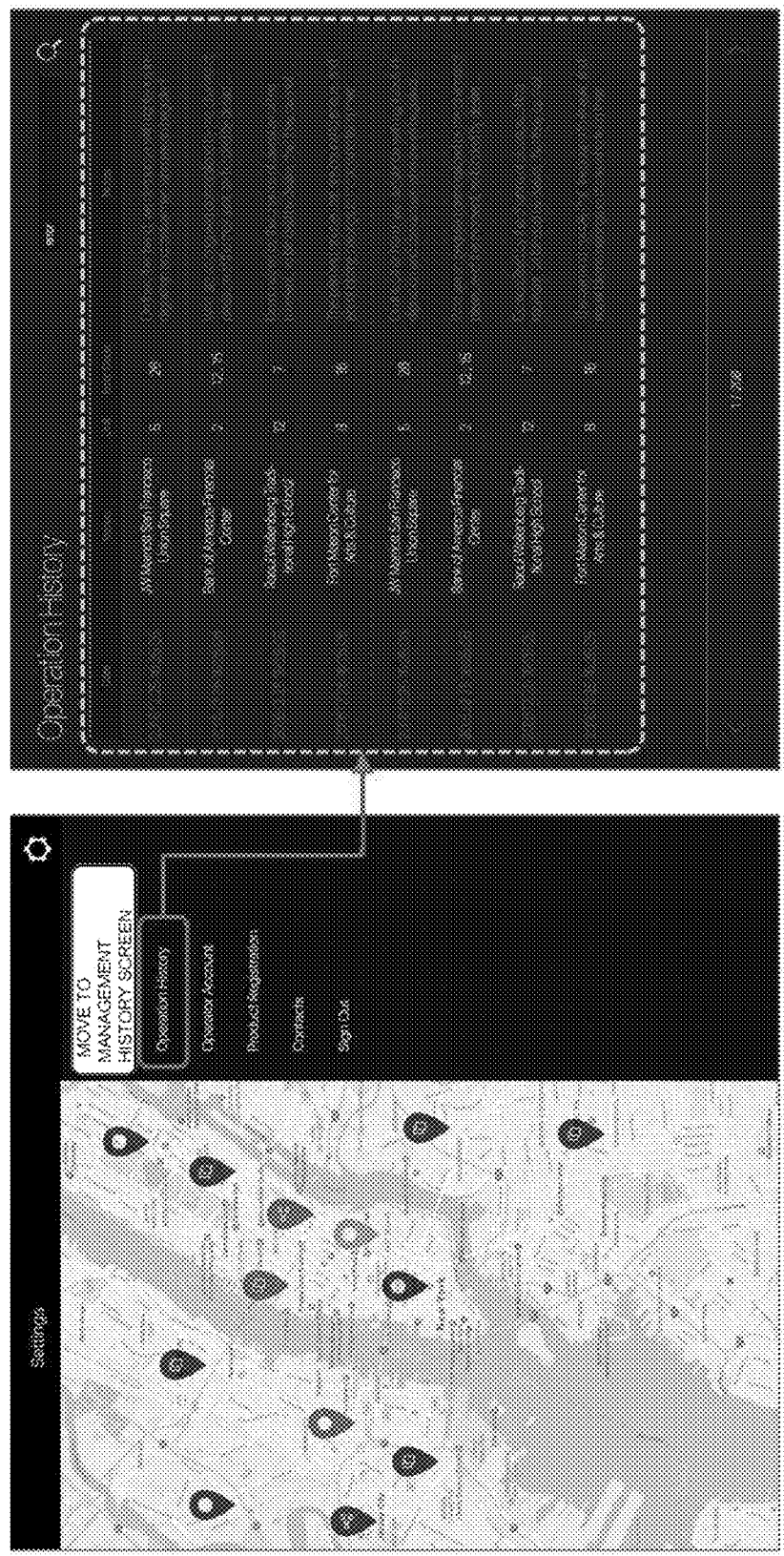

FIGS. 8 and 9 are an interface for managing the IoT boiler 100.

The manager may manage the central control system and the IoT boiler 100 of the user (customer) through the interface as shown in FIG. 8. At this time, only in a case where a room controller of the IoT boiler 100 is a boiler interlocked with an IoT platform, the product (IoT boiler 100) may be registered. In describing the present embodiment, it is assumed that the IoT boiler 100 is a boiler of which a room controller is interlocked with the IoT platform. In addition, details of the product such as an installation type, a gas type, a capacity for the registered IoT boiler 100 may be registered and utilized as reference data at the time of a fault analysis.

In addition, as shown in FIG. 9, at the time of the fault of the IoT boiler 100, an error code may be stored, and a management history corresponding to the error code may be stored and managed. At this time, the management history corresponding to the error code may be shared with other managers, who may respond to the accruing fault more quickly through the shared management history corresponding to the error code.

Hereinafter, a control method of the IoT boiler 100 in the control system of the IoT boiler 100 described above will be described with reference to FIGS. 10 to 12.

Figure 10:
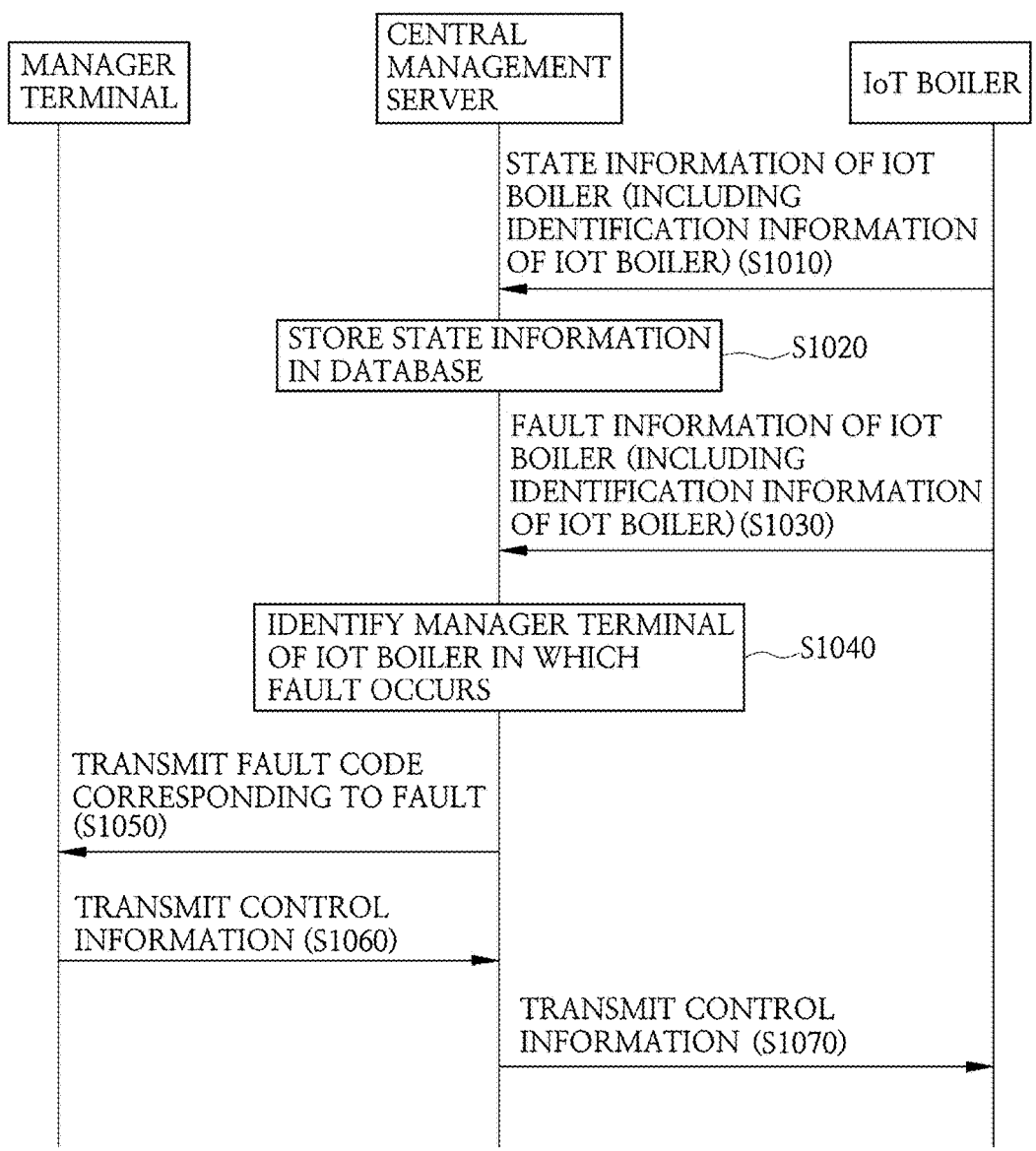
FIG. 10 is a schematic flowchart for a control method of the IoT boiler according to an embodiment of the present invention.

FIG. 10 is a schematic flowchart for the control method of the IoT boiler according to an embodiment of the present invention.

Referring to FIG. 10, the central management server 300 periodically or non-periodically receives the state information of the IoT boiler 100 from the IoT boiler 100, and stores the state information of the IoT boiler 100 in the database 310 (S1010 and S1020). At this time, the state information of the IoT boiler 100 may include the operation information related to the operation of the boiler and the control information for controlling the boiler. In addition, the state information of the IoT boiler 100 may include the identification information of the IoT boiler 100. Meanwhile, the state information of the IoT boiler 100 stored in the database 300 may be stored based on the identification information of the IoT boiler 100. At this time, in the database 310, the identification information (for example, an identification number such as an ID) and the position information registered by the manager at the time of the installation may be mapped with each other and may be stored.

The central management server 300 may receive the fault information from the IoT boiler 100 (S1030). At this time, the fault information may include the identification information of the IoT boiler 100.

The central management server 300 may identify the identification information of the manager terminal 200 corresponding to the identification information of the IoT boiler 100 (S1040).

The central management server 300 may identify the fault code corresponding to the fault information and may transmit the fault code to the identified manager terminal 200 (S1050).

The central management server 300 may receive the control information for processing the fault corresponding to the fault code from the manager terminal 200, and may transmit the control information to the IoT boiler 100 transmitting the fault information (S1060 and S1070).

Through the processes described above, the IoT boiler 100 in which the fault occurs may be remotely controlled by the manager and may be normally operated.

FIG. 11 is a schematic flowchart for the control method of the IoT boiler according to another embodiment of the present invention.

Referring to FIG. 11, the central management server 300 periodically or non-periodically receives the state information of the IoT boiler 100 from the IoT boiler 100, and stores the state information of the IoT boiler 100 in the database 310 (S1110 and S1120). At this time, the state information of the IoT boiler 100 may include the operation information related to the operation of the boiler and the control information for controlling the boiler. In addition, the state information of the IoT boiler 100 may include the identification information of the IoT boiler 100. Meanwhile, the state information of the IoT boiler 100 stored in the database 300 may be stored on the basis of the identification information of the IoT boiler 100. At this time, in the database 310, the identification information (for example, an identification number such as an ID) and the position information registered by the manager at the time of the installation may be mapped with each other and may be stored.

The central management server 300 may receive the fault information from the IoT boiler 100 (S1130). At this time, the fault information may include the identification information of the IoT boiler 100.

However, as shown in FIG. 11, the central management server 300 may not be operated due to a fault or the like. Therefore, as shown in FIG. 10, the central management server 300 should identify the fault code corresponding to the fault information received from the IoT boiler 100, transmit the fault code to the manager terminal 200 corresponding to the identification information of the IoT boiler 100, receive the control information for processing the fault corresponding to the fault code from the manager terminal 200, and transmit the control information to the IoT boiler 100. However, the central management server 300 is not able to perform such operation processes.

Therefore, after the IoT boiler 100 transmits the fault information to the central management server 300, in a case where the IoT boiler 100 is not able to receive the control information for processing the fault from the central management server 300 within a predetermined threshold time, the IoT boiler 100 may broadcast the fault occurrence information based on the position information of the IoT boiler 100 (S1140 and S1150). At this time, the IoT boiler 100 may broadcast the fault information to the authorized manager terminal 200 regardless of an area based on the position of the IoT boiler 100. At this time, the fault occurrence information may include the position information of the IoT boiler 100, and user information of the installed IoT boiler 100. In addition, the user information of the IoT boiler 100 may include user name information and user telephone number information. Meanwhile, after the IoT boiler 100 broadcasts the fault occurrence information to the manager terminal 200, the IoT boiler 100 turns off power.

Therefore, the manager having the manager terminal 200 receiving the fault occurrence information from the IoT boiler 100 may be connected to the user of the IoT boiler in which the fault occurs in a wired method using the received information (for example, the user name information, the user telephone number information, and the like), check the state of the IoT boiler 100 in which the fault occurs, take a priority action, directly visit to the user, check the occurred fault, and process the fault (S1160).

FIG. 12 is a schematic flowchart for a control method of the IoT boiler 100 in the central management server according to an embodiment of the present invention.

Referring to FIG. 12, the central management server 300 periodically or non-periodically receives the state information of the IoT boiler 100 from the IoT boiler 100, and stores the state information of the IoT boiler 100 (S1210). The IoT boiler 100 may sense the fault occurrence through the sensor. The IoT boiler 100 may transmit the fault information due to the sensed fault occurrence to the central management server 300. At this time, the state information of the boiler may further include the identification information of the IoT boiler 100 and the position information of the IoT boiler 100. The central management server 300 may identify the identification information of the manager terminal 200 corresponding to the identification information of the IoT boiler 100 that is stored in the database 300 in advance, and may transmit the fault code corresponding to the fault information of the IoT boiler 100 to the manager terminal 200.

The central management server 300 receives the fault information from the IoT boiler 100 (S1220).

The central management server 300 identifies the identification information of the manager terminal 200 corresponding to the identification information of the boiler (S1230).

The central management server 300 transmits the fault code corresponding to the fault information to the manager terminal 200 corresponding to the identified identification information, and receives the control information for processing the fault (S1240).

The central management server 300 transmits the received control information to the IoT boiler 100 (S1250).

Meanwhile, in the embodiment described above, the IoT boiler 100 may transmit the fault information to the central management server 300, in a case where the IoT boiler 100 is not able to receive a response message corresponding to the fault information within a predetermined threshold time, the IoT boiler 100 broadcasts the fault occurrence information based on the position information of the IoT boiler 100. At this time, the IoT boiler 100 may broadcast the fault information to the authorized manager terminal 200 regardless of an area based on the position of the IoT boiler 100. At this time, the fault occurrence information includes the position information of the IoT boiler 100, and user information including user name and telephone number information using the installed boiler. In addition, after the IoT boiler 100 broadcasts the fault occurrence information to the manager terminal 200, the IoT boiler 100 turns off power.

In addition, in describing the present embodiment, in a case where the manager logs in, the manager terminal 200 may provide functions of displaying the position of the installed IoT boiler 100 on an electronic map based on the electronic map that is stored in advance, and monitoring the IoT boiler 100, and controlling the IoT boiler 100. The manager terminal 200 may display the position of the installed IoT boiler 100 on the electronic map, and may display information of the installed IoT boiler 100 differently according to an authority. The IoT boiler 100 may be displayed as a single unit or a group. The function of monitoring and controlling the IoT boiler 100 may be monitoring and controlling power on/off of the IoT boiler 100, operating on/off of the IoT boiler 100, heating hot water, and controlling return water temperature of the IoT boiler 100.

According to the present invention as described above, the state information of the IoT boiler installed in a wide area can be monitored in real time, and in a case where a fault occurs in the IoT boiler, a problem due to the fault occurrence can be quickly controlled remotely.

The methods according to the embodiments of the present invention may be implemented in an application or implemented in the form of a program instruction that may be executed through various computer elements and recorded in a computer-readable recording medium. The computer-readable recording medium may include, alone or in combination with, a program instruction, a data file, a data structure, and the like. The program instruction recorded on the computer-readable recording medium may be one specially designed and configured for the present invention or one well-known and available to those skilled in the art of computer software. Examples of the computer-readable medium include a magnetic medium such as a hard disk, a floppy disk, and a magnetic tape, an optical recording medium such as a CD-ROM and a DVD, a magneto-optical medium such as a floptical disk, and a hardware device specially configured to store and execute a program instruction such as a ROM, a RAM, and a flash memory. Examples of the program instruction include a high-level language code that may be executed by a computer using an interpreter or the like, as well as a machine language such as a code generated by a complier. The hardware device may be configured to operate as one or more software modules in order to perform the process according to the present invention, and vice versa.

While the present specification includes many features, such features should not be construed as limiting the scope of the present invention or the claims. In addition, the features described in the individual embodiments of the present specification may be combined and implemented in a single embodiment. Conversely, various features described in one embodiment of the present specification may be individually implemented in various embodiments or may be implemented in appropriate combination.

Although the operations are described in a particular order in the drawings, it should not be understood that such operations are performed in a particular order as shown or a series of consecutive order, or all of the described operations are performed in order to obtain the desired result. In a specific circumstance, multitasking and parallel processing may be advantageous. In addition, it should be understood that the division of the various system elements in the above-described embodiments does not require such a division in all embodiments. The application elements and system described above may generally be implemented as a package in a single software product or multiple software products.

Since various substitutions, changes, and modifications, of the present invention described above are possible without departing from the scope and spirit of the present invention by those of ordinary skill in the art, the present invention is not limited to the embodiments above described and the accompanying drawings.

The invention claimed is:

1. A control system of an internet-of-things (IoT) boiler, comprising:
 a plurality of IoT boilers, each IoT boiler checks an operation state to transmit state information including its identification information, and senses whether or not a fault occurs through a sensor to transmit fault information including the identification information;
 a plurality of manager terminals, each manager terminal includes a boiler control application for monitoring and controlling the IoT boilers, monitors states of the IoT boilers, receives control information for controlling the IoT boilers from a manager, and transmits the control information; and
 a central management server that is connected to the IoT boilers and the manager terminals through a network, periodically or non-periodically receives and stores the state information of the IoT boilers from the IoT boilers, and receives the control information for controlling the IoT boilers from the manager terminals to perform control of the IoT boilers, wherein, when the central management server receives the fault information including the identification information from at least one IoT boiler among the plurality of IoT boilers, the central management server identifies at least one manager terminal, which corresponds to the identification information included in the fault information, among the plurality of manager terminals, based on data stored in a database of the central management server, transmits, to the at least one identified manager terminal, a fault code corresponding to the fault information, and receives, from the at least one identified manager terminal, the control information for addressing the fault occurred in the at least one IoT boiler, and perform a fault addressing process for the at least one IoT boiler.

2. The control system of the IoT boiler of claim 1, wherein the IoT boiler senses the fault occurrence through the sensor and transmits the fault information to the central management server, in a case where the IoT boiler does not receive a response message corresponding to the fault information within a predetermined threshold time, the IoT boiler broadcasts fault occurrence information to the plurality of manager terminals based on position information of the IoT boiler.

3. The control system of the IoT boiler of claim 2, wherein the fault occurrence information includes the position information of the IoT boiler, and information including a name and telephone number of a user using an installed boiler.

4. The control system of the IoT boiler of claim 2, wherein, after the IoT boiler broadcasts the fault occurrence information to the manager terminal, the IoT boiler turns off power.

5. The control system of the IoT boiler of claim 1, wherein, in a case where the manager terminal is logged in by the manager, the manager terminal displays positions of an installed plurality of IoT boilers on an electronic map based on the electronic map that is stored in the manager terminal, displays information of the installed plurality of IoT boilers differently according to an authority for controlling respective installed IoT boiler, and provides a function of monitoring and controlling the installed plurality of IoT boilers.

6. The control system of the IoT boiler of claim 5, wherein each of the installed plurality of IoT boilers is displayed as a single unit or a group with one or more other installed IoT boilers, the function of monitoring and controlling the installed plurality of IoT boilers includes monitoring and controlling power on/off of the installed plurality of IoT boilers, operating on/off of the installed plurality of IoT boilers, heating hot water, and controlling return water temperature of the installed plurality of IoT boilers.

7. A control method of a plurality of IoT boilers in a control system of the plurality of IoT boilers, the control system comprising the plurality of IoT boilers, each IoT boiler checks an operation state to transmit state information including its identification information, and senses whether or not a fault occurs through a sensor to transmit fault information including the identification information, a plurality of manager terminals, each manager terminal includes a boiler control application for monitoring and controlling the IoT boilers, monitors states of the IoT boilers, receives control information for controlling the IoT boilers from a manager, and transmits the control information, and a central management server that is connected to the IoT boilers and the manager terminals through a network, the control method comprising:

periodically or non-periodically receiving and storing the state information of the IoT boilers from the IoT boilers, by the central management server;

receiving the fault information including the identification information from at least one IoT boiler among the plurality of the IoT boilers, by the central management server;

identifying at least one manager terminal, which corresponds to the identification information included in the fault information, among the plurality of manager terminals, based on data stored in a database of the central management server, by the central management server;

transmitting, to the at least one identified manager terminal, a fault code corresponding to the fault information, and receiving, from the at least one identified manager terminal, the control information for addressing the fault occurred in the at least one IoT boiler, by the central management server; and transmitting received control information to the at least one IoT boiler, by the central management server, for addressing the fault.

8. The control method of the IoT boiler of claim 7, wherein the IoT boiler senses the fault occurrence through the sensor and transmits the fault information to the central management server, and in a case where the IoT boiler does not receive a response message corresponding to the fault information within a predetermined threshold time, the IoT boiler broadcasts fault occurrence information to the plurality of manager terminals based on position information of the IoT boiler.

9. The control method of the IoT boiler of claim 8, wherein the fault occurrence information includes the position information of the IoT boiler, and information including name and telephone number of a user using an installed boiler.

10. The control method of the IoT boiler of claim 8, wherein, after the IoT boiler broadcasts the fault occurrence information to the manager terminal, the IoT boiler turns off power.

11. The control method of the IoT boiler of claim 7, wherein, in a case where the manager terminal is logged in by the manager, the manager terminal displays positions of an installed plurality of IoT boilers on an electronic map based on the electronic map that is stored in the manager terminal, displays information of the installed plurality of IoT boilers differently according to an authority for controlling respective installed IoT boiler, and provides a function of monitoring and controlling the installed plurality of IoT boilers.

12. The control method of the IoT boiler of claim 7, wherein each of the installed plurality of IoT boilers is displayed as a single unit or a group with one or more other installed IoT boilers, the function of monitoring and controlling the installed plurality of IoT boiler includes monitoring and controlling power on/off of the installed plurality of IoT boilers, operating on/off of the installed plurality of IoT boilers, heating hot water, and controlling return water temperature of the installed plurality of IoT boilers.

* * * * *